US007212688B2

(12) United States Patent
Zahner et al.

(10) Patent No.: US 7,212,688 B2
(45) Date of Patent: May 1, 2007

(54) COMPUTER PROGRAM AND METHOD FOR CONVERTING AN IMAGE TO MACHINE CONTROL DATA

(75) Inventors: L. William Zahner, Kansas City, MO (US); Eric Willhelm, Lawrence, KS (US)

(73) Assignee: A. Zahner Co., Kansas City, MO (US)

( * ) Notice: Subject to any disclaimer, the term of this patent is extended or adjusted under 35 U.S.C. 154(b) by 415 days.

(21) Appl. No.: 10/748,552

(22) Filed: Dec. 30, 2003

(65) Prior Publication Data

US 2005/0142492 A1 Jun. 30, 2005

(51) Int. Cl.
*G06K 9/36* (2006.01)

(52) U.S. Cl. ...................... 382/285; 358/3.29; 358/3.3; 345/419; 345/420; 345/427

(58) Field of Classification Search ................ 382/285; 358/3.29, 3.3, 3.33; 345/419–427
See application file for complete search history.

(56) References Cited

U.S. PATENT DOCUMENTS 4,967,286 A 10/1990 Nomula et al.
5,268,999 A * 12/1993 Yokoyama .................. 345/441
5,609,938 A * 3/1997 Shields ........................ 428/138
5,958,651 A 9/1999 van Hoof et al.
6,304,050 B1 * 10/2001 Skaar et al. ........... 318/568.11
2004/0096120 A1 * 5/2004 Tong et al. ................. 382/285
2005/0134599 A1 * 6/2005 Nayar et al. ................ 345/589
2005/0259418 A1 * 11/2005 Callegari et al. ........... 362/249

* cited by examiner

*Primary Examiner*—Jingge Wu
*Assistant Examiner*—Patrick Edwards
(74) *Attorney, Agent, or Firm*—Hovey Williams LLP

(57) ABSTRACT

A method of transferring a representation of an image to a surface (12) of a building (14). The method comprising receiving the image as an image file, converting the image file to a raster file comprising a series of dots, scaling the raster file to the surface and dividing the raster file into a plurality of sub-components, associating the dots with markings (26), and transferring the markings (26) onto a plurality of metal sheets (24). The markings (26) may be indentations, holes, and/or bumps. The dots may be manipulated to accommodate features (20) of the surface (12), such as windows, doors, indicia (22), and edges of the sheets (24). The markings (26) are preferably transferred to the sheets (24) by a metal working machine (28). Thus, the method may include generating one or more control files that may be used by the machine (28).

16 Claims, 7 Drawing Sheets

COMPUTER PROGRAM AND METHOD FOR CONVERTING AN IMAGE TO MACHINE CONTROL DATA

BACKGROUND OF THE INVENTION

1. Field of the Invention

The present invention relates to design systems. More particularly, the present invention relates to a computer program and method that may be used to transfer a representation of an image to a surface of a building.

2. Description of Prior Art

Builders and architects are increasingly using metal sheets to clad buildings. These sheets are manipulated to provide an aesthetic facade. Such manipulation can be, and often is, performed by machine. For example, a machine may be used to impart bumps to sheets of metal. However, highly complex machine code must be developed to control the machine.

Where the bumps are to form a simple geometric pattern, machine code may be generated somewhat automatically. However, simple patterns are uninteresting, and therefore limited in their aesthetic appeal. Furthermore, such machine code must still be checked for errors and must often be modified to accommodate features of a building.

Modification of such machine code is often tedious and subject to human error, thereby requiring many error checking steps. Furthermore, any changes that must be implemented after such machine code is generated, requires more human based manipulation of the machine code, further increasing the opportunity for error.

If a more complex pattern or image is to be used, the machine code must be generated almost completely by hand. Hand generation of the machine code is extremely tedious and even more susceptible to human error. For these reasons, human based manipulation or generation of machine code is typically prohibitive.

Accordingly, there is a need for an improved method that overcomes the limitations of the prior art.

SUMMARY OF THE INVENTION

The present invention overcomes the above-identified problems and provides a distinct advance in the art of design systems. More particularly, the present invention provides a computer program and method that may be used to transfer a representation of an image to a surface of a building. The program of the present invention is preferably run on computer equipment capable of manipulating the image and running other computer aided design or drafting (CAD) software. The image is preferably captured using a digital camera, but may be drawn or scanned from a traditional picture.

The image is preferably provided in a digital image file having a common file format and is converted to a raster file comprising a series of dots. The dots are preferably arranged according to a predetermined grid and vary in size according to the image. In some cases, the dots may be so small as to be left blank for all practical purposes. The raster file is preferably scaled so that the representation of the image will substantially cover the entire surface of the building. For example, the representation of the image may be overlaid on a drawing of the surface and then stretched to cover the surface. Stretching the representation in this manner scales the raster file.

The raster file is then preferably divided into a plurality of sub-components, with each sub-component corresponding to a different portion of the image. In this manner, the image is broken down and the sub-components may be individually manipulated. Thus, changes to one portion of the image do not necessarily impact any other of the other portions or corresponding sub-components.

The dots of each sub-component may be manipulated to accommodate features of the surface, such as windows and doors. The dots of each sub-component may also be manipulated to produce a logo or other indicia independent of the image. To aid in manipulation of the dots, the features can be added to the drawing of the surface. This eliminates tedious trial and error methods that would otherwise be required to insure that the indicia did not conflict with one of the windows or doors.

It should be noted that the surface to be covered may be rather large. Thus, it is likely not practical to transfer the representation of the image to the surface in one step. For this reason, the surface is preferably covered by a plurality of metal sheets. Each sub-component is preferably associated with one of the sheets. The sheets are preferably small enough to allow each sheet to be efficiently manipulated, while large enough to minimize the number of sheets that are required to cover the surface.

The dots are associated with markings, such as indentations, bumps, and/or holes, that will be transferred to the sheets in order to create the representation of the image, once the sheets are assembled to cover the surface. The markings are preferably transferred to the sheets by a machine, such as a punch or a press. The sheets are preferably slightly larger than required by the associated sub-component to allow edges of the sheets to be formed into flanges that may be used to secure the sheets together and adjacent the building. It should be noted that the machine may have a difficult time transferring the markings to the sheets at or near the edges. For this reason, the dots may also need to be manipulated at or near the sub-component edges.

Once the dots have been manipulated to accommodate the features, indicia, and the edges, as discussed above, the program generates a control file for each sub-component from which the machine may transfer the markings onto the corresponding sheet. Since the sheets may include more than one of the markings and the machine typically uses dies specific to each marking, the machine may be reconfigured for each sheet and marking combination. For these reasons, the program may generate one control file for each sheet and marking combination. For example, where the sheets include holes and indentations, the program may generate two control files for each sheet, with a first control file being used by the machine to transfer the holes and a second control filed being used by the machine to transfer the indentations. In this manner, the control files are generated in order to impart the representation to the surface. Finally, the sheets are assembled adjacent the surface of the building.

It can be seen that the markings are expected to reflect the representation of the image. The markings are derived from the dots of the raster file, and therefore the representation is somewhat abstract with respect to the image. As discussed above, the sheets may include different markings. Thus, in order to differentiate between the markings, the dots may be shown in different colors within the program. For example, a first color, such as blue, may be used to represent a hole marking, while a second color, such as red, is used to represent an indention marking. Furthermore, a laying function of the program may be used to differentiate the markings. For example, the hole markings may be on a first layer, while the indention markings are on a second layer. Similarly, the drawing of the surface may be on a third layer. In this manner, the user may select which layers he or she would like to view. Additionally, each layer may be associated with an appropriate one of the control files, such that each control file is generated from selected layers, thereby uniquely generating the control file for each sheet and marking combination.

In use, an architect or another designer provides the image file. The image file is received in the computer equipment and made available to the program. The program then converts the image file to the raster file. The raster file is scaled to occupy the surface of the building and divided into the sub-components that each correspond to one of the sheets. The user may then manipulate the dots as needed to accommodate the features, indicia, and edges. Finally, the user may instruct the program to generate the control files that are to be used by the machine to transfer the markings onto the sheets, thereby imparting the representation to the surface.

It should be noted that changes to any portion of the image or raster file requires only further manipulation of the associated sub-component and regeneration of the associated control file. For example, if after the control files have been generated, the designer or other user wishes to change the indicia's location, the user need only manipulate the dots and then instruct the program to regenerate the control files for the impacted sheets. This process is a significant advancement in that the user is not required to manipulate the control files, which can be highly complex, in response to a change in a previous step. It should be noted that the user may go back to any previous step, at any point in the process.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
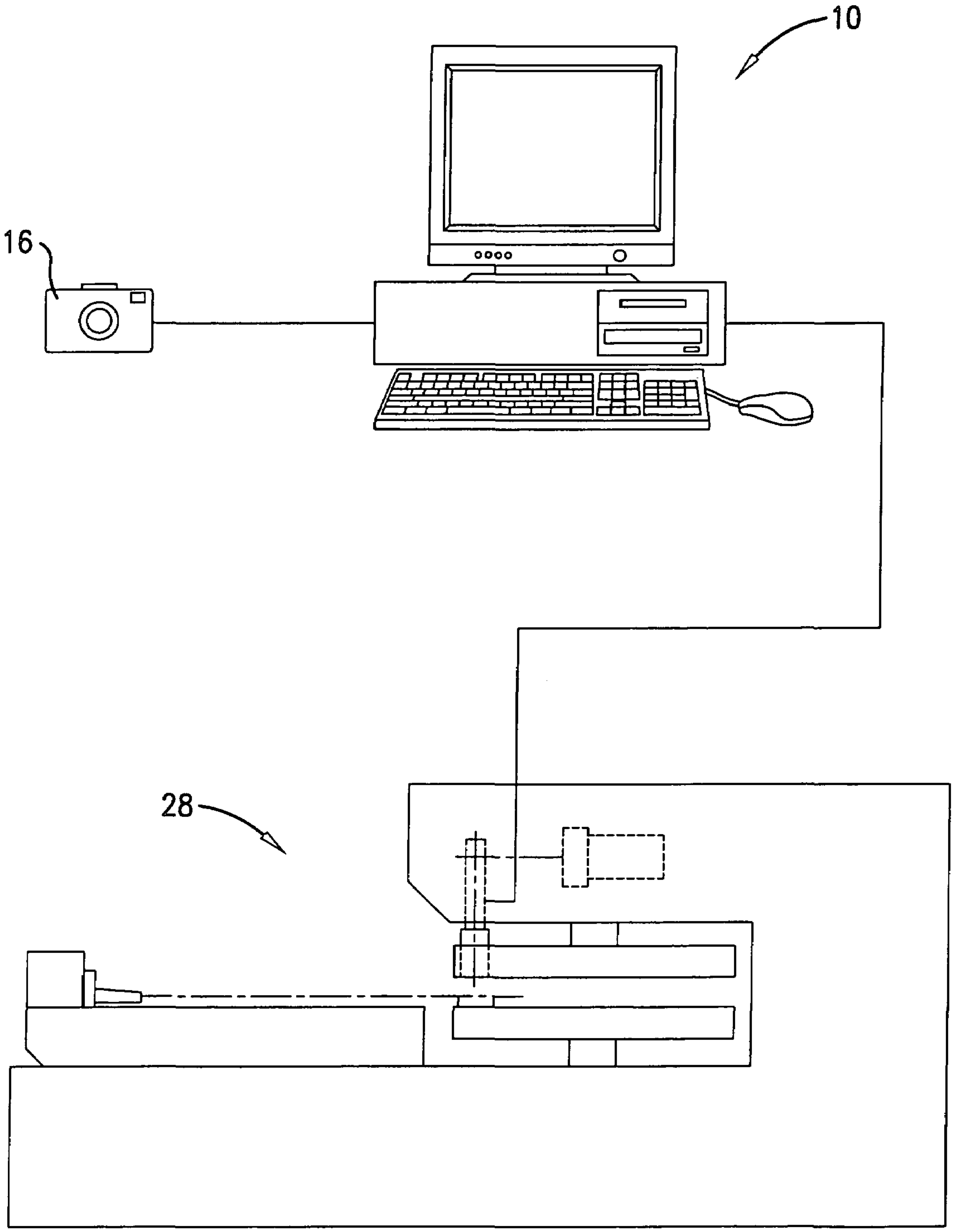
FIG. 1 is a schematic diagram of equipment that may be used to implement a preferred embodiment of the present invention.
Figure 2:
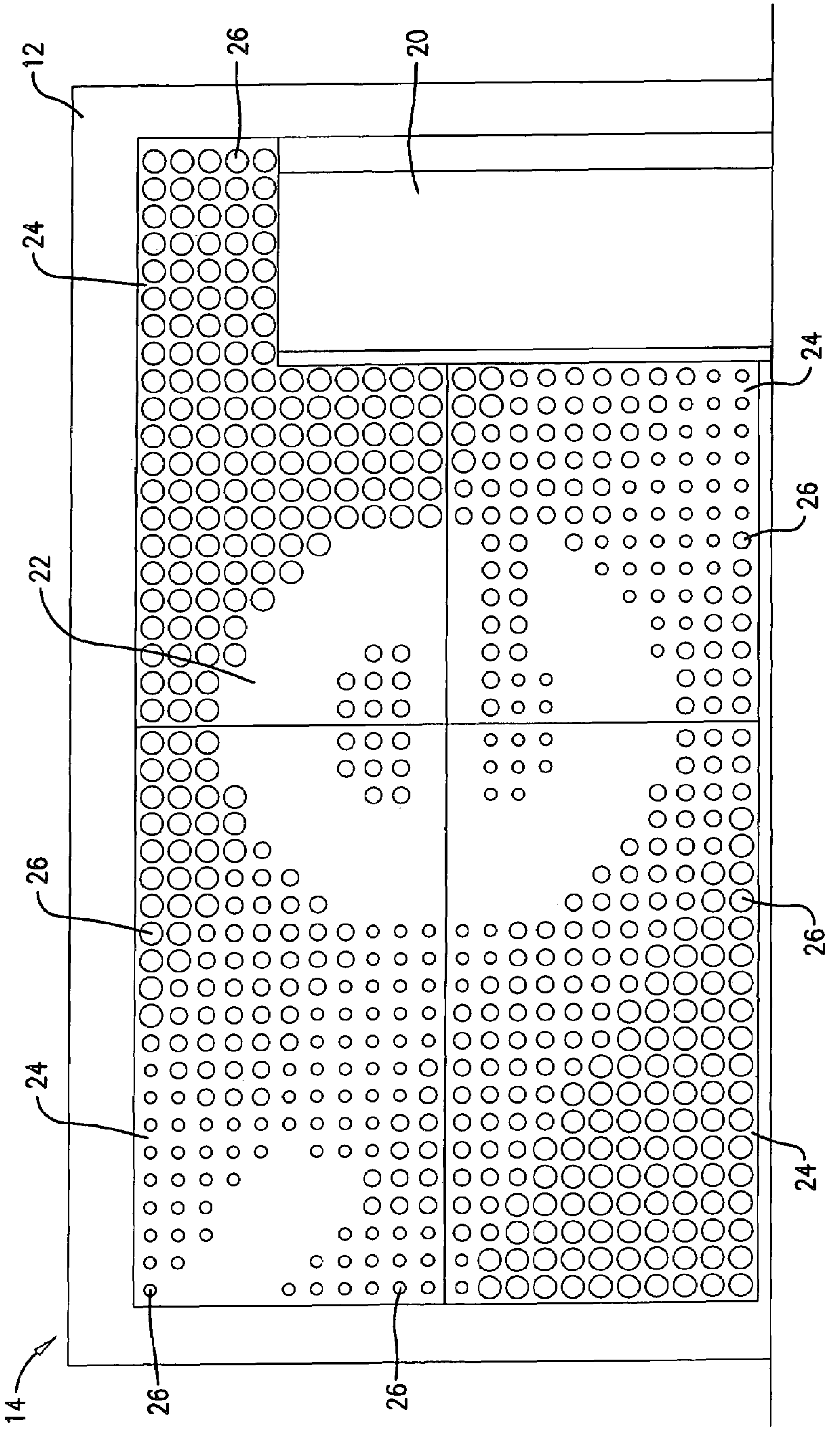
FIG. 2 is an elevation view of a plurality of sheets each having a portion of an image transferred thereon in accordance with the present invention and shown attached to a building.

Referring to FIGS. 1–2, the computer program and method in accordance with a preferred embodiment of the present invention are preferably implemented with use of computer equipment 10 to transfer a representation of an image to a surface 12 of a building 14. The image is provided to the program, which is preferably run on the computer equipment 10. The computer equipment 10 is preferably capable of not only manipulating the image but also running other computer aided design or drafting (CAD) software, such as AutoCad from Autodesk, Inc. The program and method of the present invention may even be incorporated into the CAD software. For example, some steps of the method may be performed in the CAD software, with other steps being performed outside the CAD software. As such, the program of the present invention may be a supplement added to the CAD software or may simply use a CAD file generated by the CAD software and be completely independent of the CAD software. The computer equipment 10 may comprise one or more individual servers or conventional personal computers, such as those available from Gateway, Hewlett Packard, Dell, IBM, and Compaq.

The image is preferably provided by a digital camera 16. However, other methods of providing the image may be used. For example, a picture from a traditional film camera may be scanned or the image may be created using the CAD software or another drawing or drafting software. The method used to acquire the image is not as important as the image being provided to the present invention in a digital image file having a common file format, such as TIFF, JPEG, GIF, and BMP.

The program converts the image file to a raster file, or similar file, comprising a series of dots. The dots are preferably arranged according to a predetermined grid and vary in size according to the image. In some cases, the dots may be so small as to be left blank for all practical purposes. The raster file is preferably scaled so that the representation of the image will substantially cover the entire surface 12 of the building 14. Alternatively, the raster file may be scaled such that the representation of the image will only cover a selected portion of the surface 12. For example, the representation of the image may be overlaid on a drawing of the surface 12 and then stretched to cover the surface 12 or the selected portion thereof. Stretching the representation in this manner scales the raster file. The raster file may be scaled by manipulating the size and/or number of the dots. Furthermore, the raster file may be scaled during conversion from the image file, such that scaling and conversion are performed substantially simultaneously.

It is important to note that the representation may selectively be stretched with its aspect ratio locked or unlocked, depending upon a user's desire. Furthermore, multiple images may be spliced together. For example, a first representation of a first image may be stretched to cover a first portion of the surface 12 while a second representations of a second image is stretched to cover a second portion of the image. It is important to note that the first and second portions of the surface 12 are not required to meet. In any case, both image files are preferably combined into the raster file, thereby effectively joining the images.

The raster file is then preferably divided into a plurality of sub-components, with each sub-component corresponding to a different portion of the image. In this manner, the image is broken down and the sub-components may be individually manipulated. Thus, as will be discussed in further detail below, changes to one portion of the image do not necessarily impact any of the other portions or corresponding sub-components.

The dots of each sub-component may be manipulated to accommodate features 20 of the surface 12, such as windows and doors. The dots of each sub-component may also be manipulated to produce a logo or other indicia 22 independent of the image. To aid in manipulation of the dots, the features 20 can be added to the drawing of the surface 12. Specifically, the drawing may be derived from a photograph, a scanned paper drawing, or a CAD file of the surface 12.

Furthermore, the drawing may be created within the program independently of any outside sources. In either case, this eliminates tedious trial and error methods that would otherwise be required to insure that the indicia 22 did not conflict with one of the windows or doors.

It should be noted that the surface 12 may be rather large. Thus, it is likely not practical to transfer the representation of the image to the surface 12 in one step. For this reason, the surface 12 is preferably covered by a plurality of sheets 24. Each sub-component is preferably associated with and corresponds to one of the sheets 24. The sheets 24 are preferably small enough to allow each sheet 24 to be efficiently manipulated, while large enough to minimize the number of sheets 24 that are required to cover the surface 12. The sheets 24 are also preferably rectangular, but may be other shapes. Furthermore, the sheets 24 may need to be abnormally shaped in order to accommodate the shape or features 20 of the surface 12. This is especially true of those sheets that form the surface's 12 perimeter.

It is expected that the surface 12 will be exposed to weather and/or other potential causes of corrosion. Therefore, the sheets 24 are preferably made of a metal that resists corrosion, such as copper, aluminum, brass, or stainless steel. However, the sheets 24 may be made of other materials that resist corrosion. Alternatively, especially where the surface 12 is not exposed to causes of corrosion, the sheets 24 may be made of metal with little or no resistance to corrosion, such as carbon steel. Although, it is important to recognize that even materials with little or no resistance to corrosion can be shielded from corrosion, such as by painting such materials.

The dots are associated with markings 26 that will be transferred to the sheets 24 in order to create the representation of the image, once the sheets 24 are assembled to cover the surface 12. The markings 26 are preferably indentations, bumps, and/or holes and are preferably transferred to the sheets 24 by a metal working machine 28, such as a punch or a press. The sheets 28 are preferably slightly larger than required by the associated sub-component to allow edges of the sheets 28 to be formed into flanges that may be used to secure the sheets 24 together and adjacent the building 14.

It should be noted that the machine 28 may have a difficult time transferring the markings 26 to the sheets 24 at or near the edges. For this reason, the dots may also need to be manipulated at or near the sub-component edges. For example, the dots may be forced to be smaller than the image would otherwise require. Alternatively, the dots may be removed or blanked out in order to accommodate the flanges at the edges of the sheets 24.

Once the dots have been manipulated to accommodate the features 20, indicia 22, and the edges, as discussed above, the program generates a control file for each sub-component from which the machine 28 may transfer the markings 26 onto the corresponding sheet 24. Since the sheets 24 may include more than one of the markings and the machine 28 typically uses dies specific to each marking 26, the machine 28 must typically be reconfigured for each sheet and marking combination. For these reasons, the program may generate one control file for each sheet and marking combination. For example, where the sheets 24 include holes and indentations, the program may generate two control files for each sheet 24, with a first control file being used by the machine 28 to transfer the holes and a second control filed being used by the machine 28 to transfer the indentations. In this manner, the control files are generated in order to impart the representation to the surface 12.

Finally, the sheets 24 are assembled adjacent the surface 12 of the building 14. The flanges of the sheets 24 may be welded, bolted, or otherwise attached together, such as by using an adhesive. In this manner, the representation of the image is transferred to the building 14.

It can be seen that the markings 26 are expected to reflect the representation of the image. The markings 26 are derived from the dots of the raster file, and therefore the representation is somewhat abstract with respect to the image. As discussed above, the sheets may include different markings 26. Thus, in order to differentiate between the markings 26, the dots may be shown in different colors within the program. For example, a first color, such as blue, may be used to represent a hole marking, while a second color, such as red, is used to represent an indention marking. Furthermore, a laying function of the program may be used to differentiate the markings 26. For example, the hole markings 26 may be on a first layer, while the indention markings 26 are on a second layer. Similarly, the drawing of the surface 12 may be on a third layer. In this manner, the user may select which layers he or she would like to view. Additionally, each layer may be associated with an appropriate one of the control files, such that each control file is generated from selected layers, thereby uniquely generating the control file for each sheet and marking combination.

While the present invention has been described above, it is understood that other materials and/or dimensions can be substituted. For example, the markings 26 may overlap, such that a bump may overlap a hole. Furthermore, the sheets 24 may include any combination of the markings 26. Additionally, some of the sheets 24 may include different combinations of the markings 26, as compared with other sheets 24. While the sheets 24 preferably simply cover the surface 12, the sheets 24 may be used to actually form the surface 12. It is also conceivable that the image file be provided to the program in raster format. These and other minor modifications are within the scope of the present invention.

Figure 3:
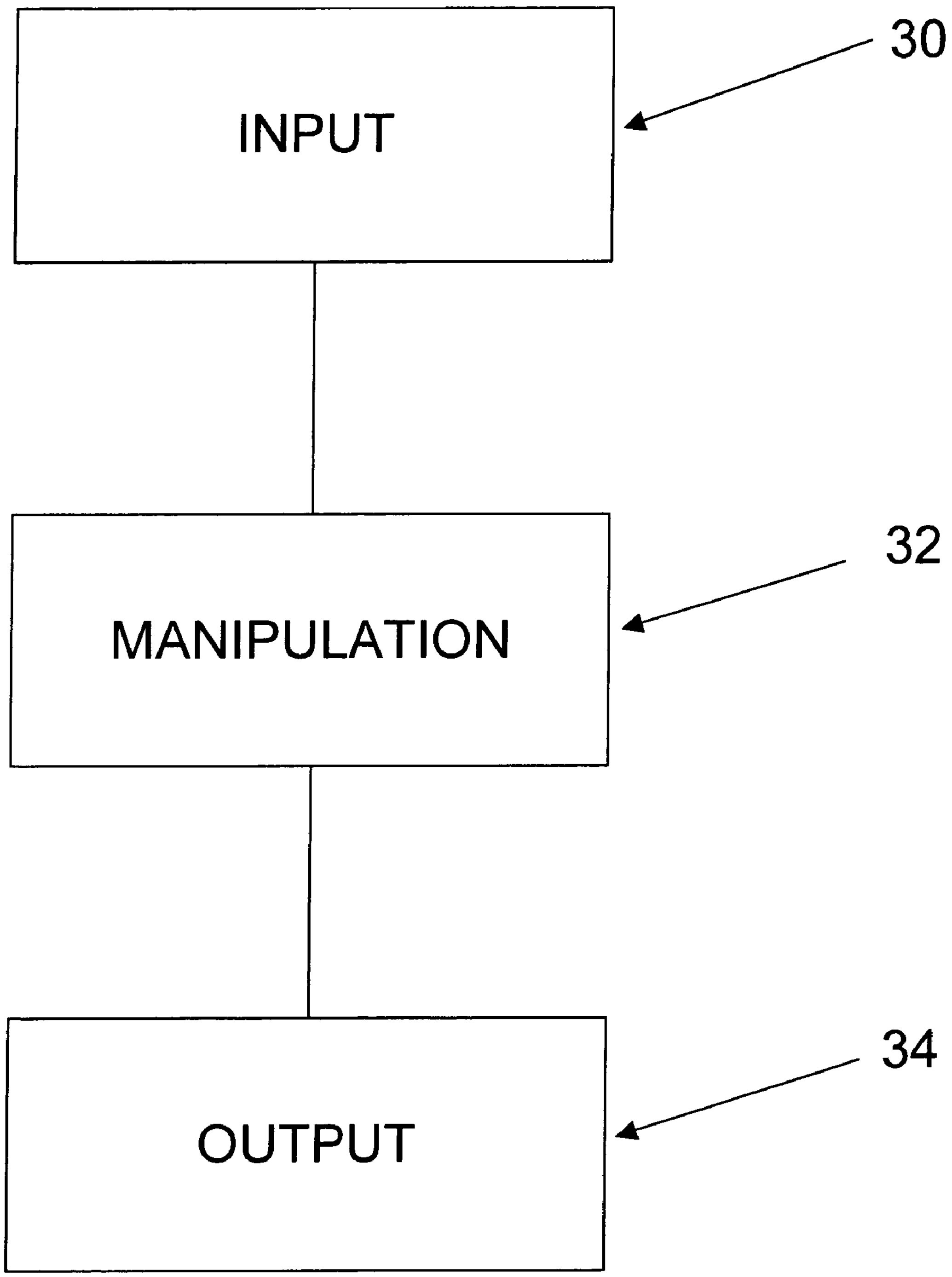
FIG. 3 is a block diagram of major processes of the present invention.

Additionally, while the tasks and processes described herein have been described as being performed by the program, selected ones of those processes may in fact be performed by more than one program or independent process. For example, referring also to FIG. 3, the program, as described herein, may be comprised of an input process 30, a manipulation process 32, and an output process 34.

Figure 4:
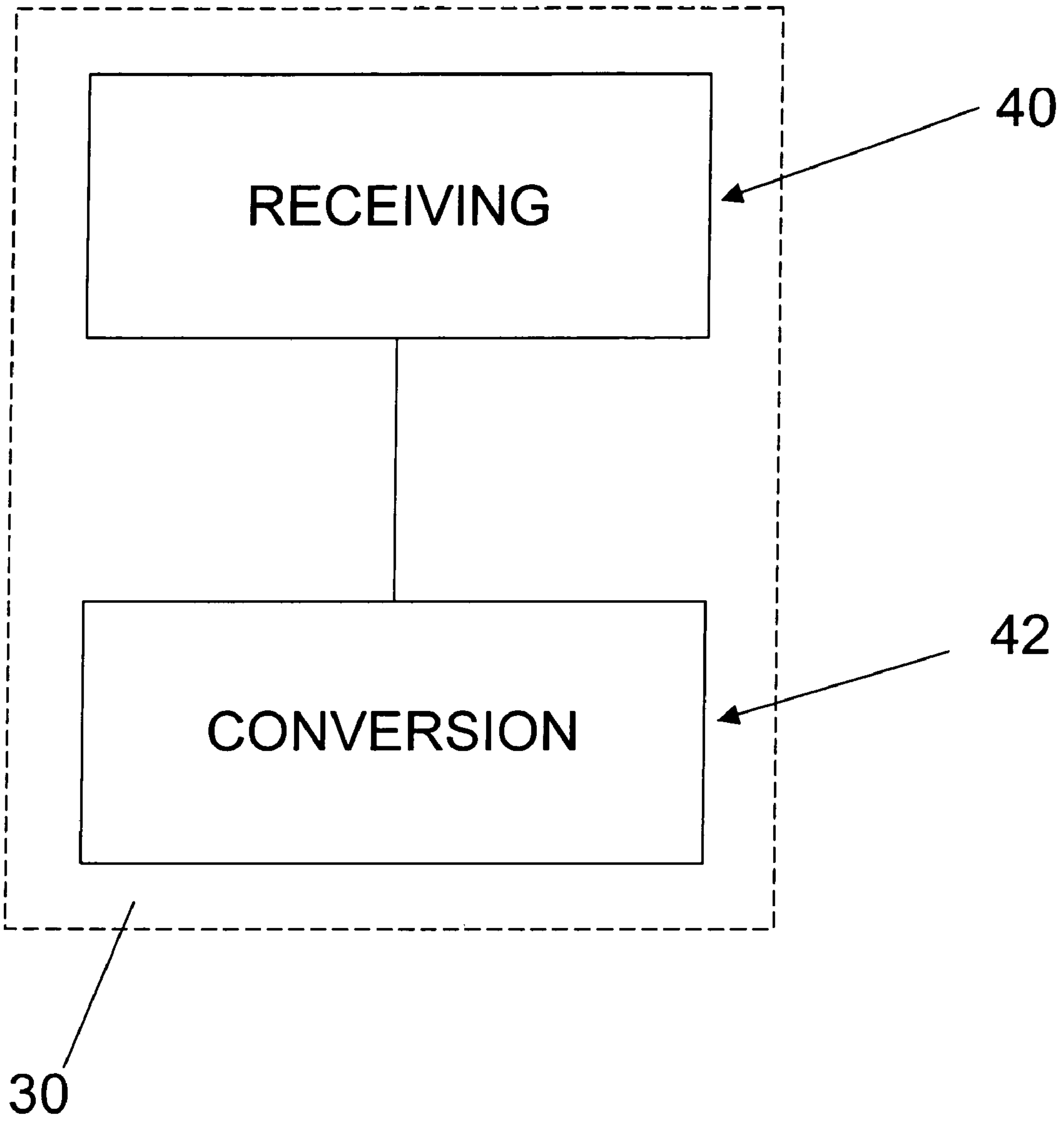
FIG. 4 is a block diagram of input processes of the present invention.
Figure 5:
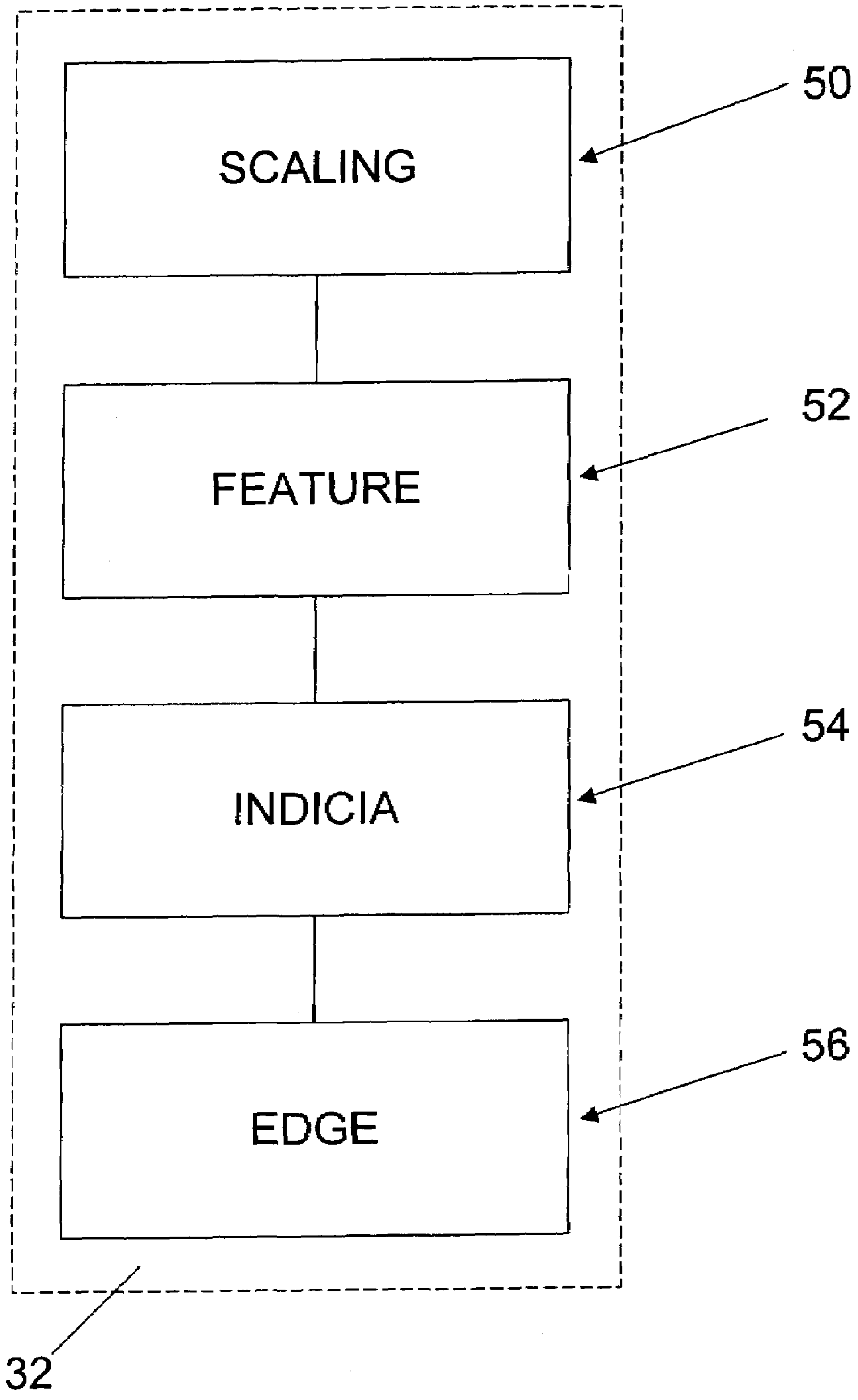
FIG. 5 is a block diagram of manipulation processes of the present invention.
Figure 6:
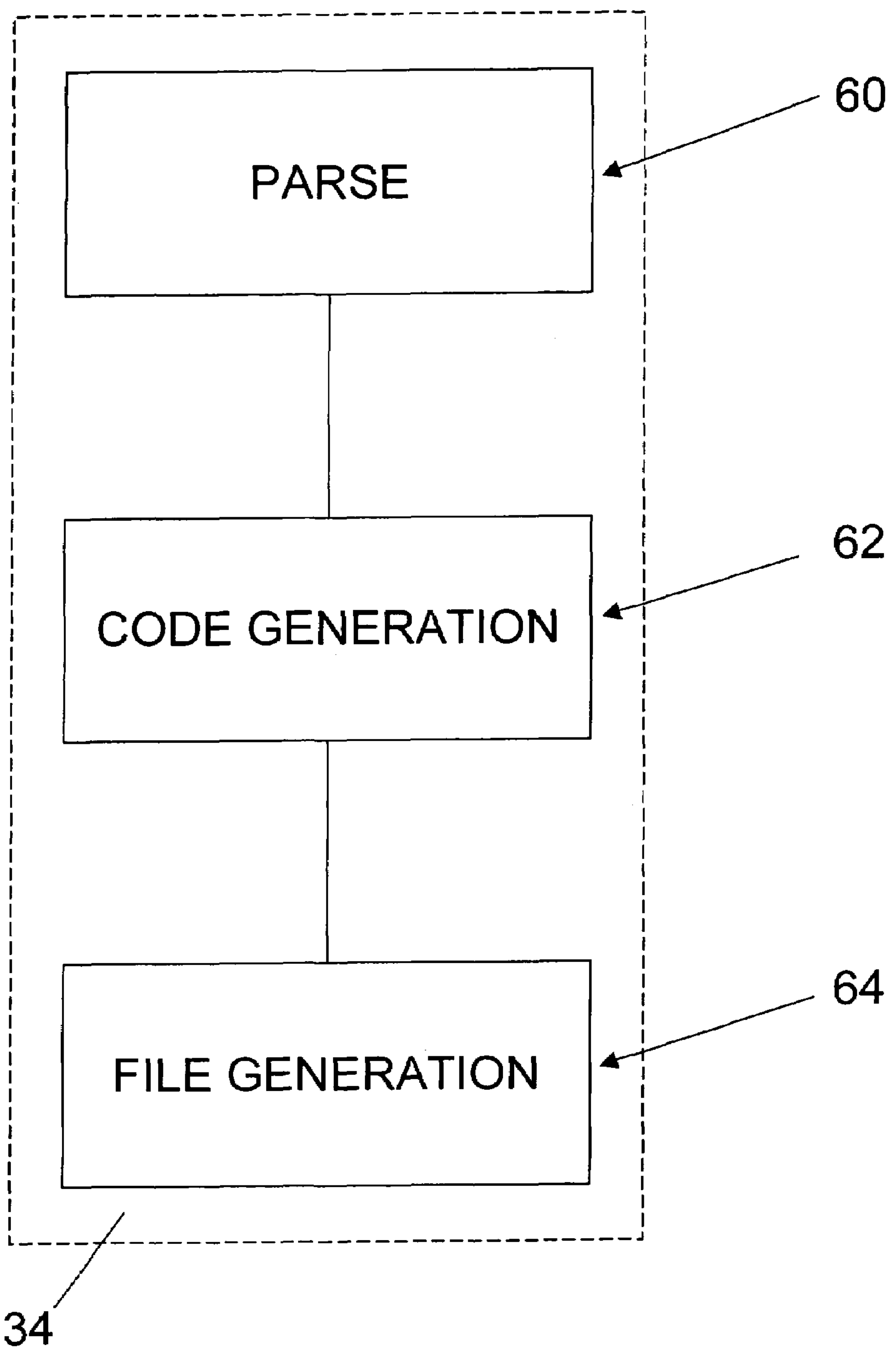
FIG. 6 is a block diagram of output processes of the present invention.

These processes 30,32,34 may be further distributed into sub-processes. For example, referring also to FIG. 4, the input process 30 may be divided into a receiving sub-process 40 and a conversion sub-process 42. Similarly, referring also to FIG. 5, the manipulation process 32 may be divided into a scaling sub-process 50, a feature accommodating sub-process 52, an indicia accommodating sub-processes 54, and an edge accommodating sub-process 56. Referring also to FIG. 6, the output process 32 may be divided into a markings parsing sub-process 60, a control code generating sub-process 62, and a control file generating sub-process 64.

Furthermore, some of the sub-processes may actually be part of a different process. For example, the scaling sub-process 50 may actually be part of the input process 30, rather than the manipulation process 32, as described above. Finally, any of the above sub-processes may be run on computer systems independent from but otherwise similar to the computer equipment 10 described herein.

Figure 7:
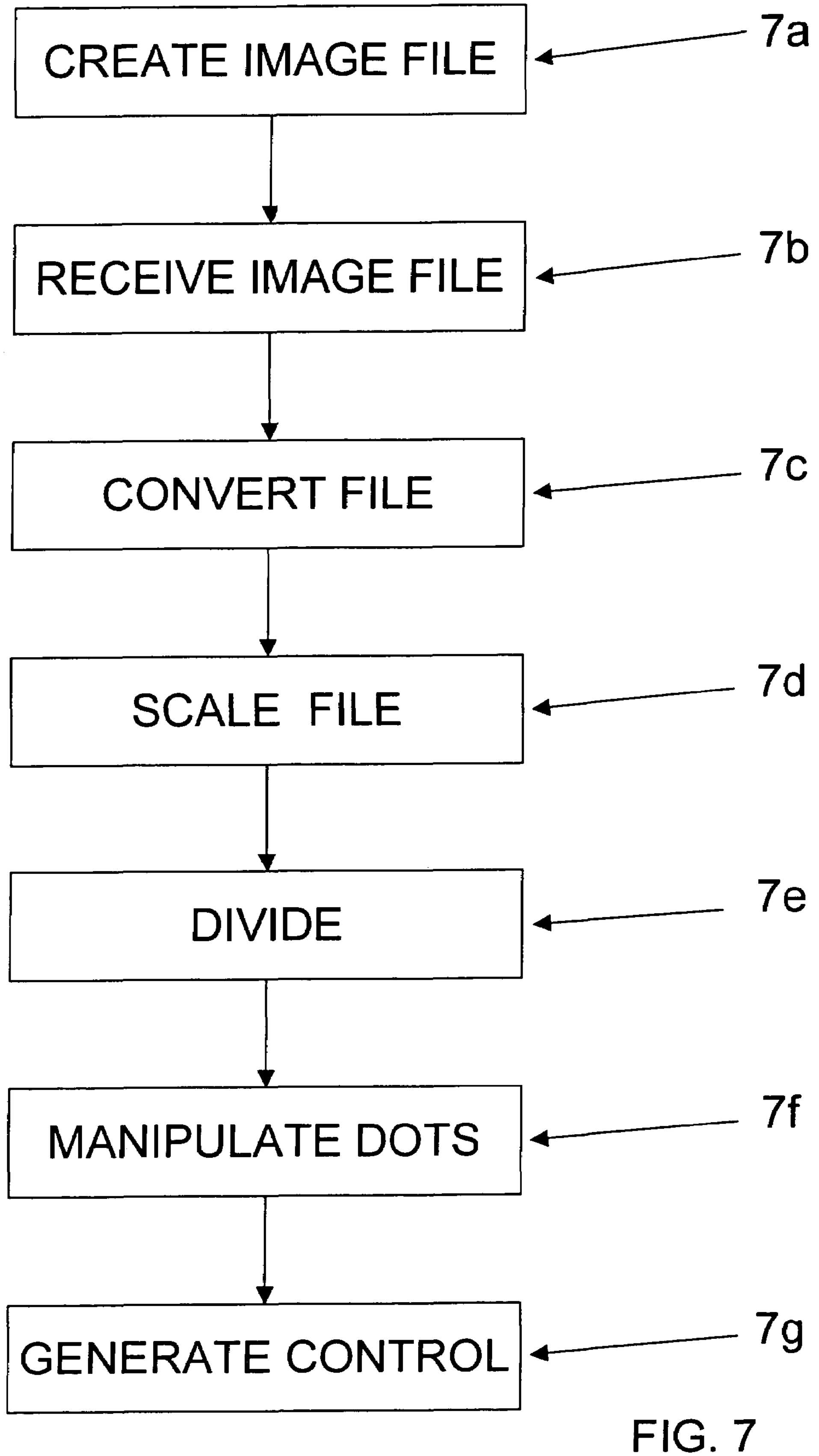
FIG. 7 is flow chart showing the steps to generate control files from which a machine may transfer the image to the sheets in accordance with a method of the present invention.

The flow chart of FIG. 7 shows the functionality and operation of a preferred implementation of the present invention in more detail. In this regard, some of the blocks of the flow chart may represent a module segment or portion of code of the program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

In use, referring also to FIG. 7, an architect or another designer takes or otherwise creates the image, as shown in step 7*a*. The image is preferably taken using the camera 16, thereby substantially automatically creating the image file. The image file is then received in the computer equipment 10 and made available to the program, as shown in step 7*b*. The camera 16 may be directly wired to the computer equipment 10 or may be connected to the computer equipment 10 through a network. Alternatively, the image file may be stored on a removable media, which is physically transferred from the camera 16 to the computer equipment 10. It is important to note that other commonly used methods of transferring a file to a computer may also be used. Furthermore, the image file may be created on the computer equipment 10 or even within the program itself.

The program then converts the image file to the raster file, as shown in step 7*c*. The raster file is also scaled to occupy the selected portion of the surface 12 of the building 14, as shown in step 7*d*. The raster files is then divided into the sub-components that each correspond to one of the sheets 24, as shown in step 7*e*. The user may then manipulate the dots as needed to accommodate the features 20, indicia 22, and edges, as described above and shown in step 7*f*. Finally, the user may instruct the program to generate the control files that are to be used by the machine 28 to transfer the markings 26 onto the sheets 24, thereby imparting the representation to the surface 12, as shown in step 7*g*.

It should be noted that changes to any portion of the image or raster file requires only further manipulation of the associated sub-component and regeneration of the associated control file. For example, if after the control files have been generated, the designer or other user wishes to change the indicia's 22 location, the user need only go back to step 7*f* for the impacted sub-components. Specifically, the user need only manipulate the dots and then instruct the program to regenerate the control files for the impacted sheets 24. This process is a significant advancement in that the user is not required to manipulate the control files, which can be highly complex, in response to a change in a previous step. It should be noted that the user may go back to any previous step, at any point in the process. However, if the user wishes to substantially change the image, the user preferably simply starts the process anew with the changed image.

Having thus described a preferred embodiment of the invention, what is claimed as new and desired to be protected by Letters Patent includes the following:

The invention claimed is:

1. A method of transferring a representation of an image to a surface, the method comprising the steps of:

a) receiving the image as an image file;

b) converting the image file to an intermediate file comprising a series of dots that vary according to the image;

c) manipulating the dots to accommodate features of the surface;

d) converting the intermediate file into at least one control file, the control file being operable to be utilized by a machine to physically manipulate the surface according to the dots, thereby transferring the representation to the surface; and e) scaling the intermediate file to the surface by dividing the intermediate file into a plurality of sub-components, wherein each of the sub-components corresponds to one of a plurality of individual sheets that are to be combined to form the surface and the surface is larger than the machine can handle.

2. The method as set forth in claim 1, wherein the dots are positioned according to a predetermined grid.

3. The method as set forth in claim 2, wherein the intermediate file is a raster file.

4. The method as set forth in claim 1, wherein the dots and the markings vary in size according to the image.

5. The method as set forth in claim 1, wherein the markings are selected from the group consisting of indentations, holes, bumps, and blanks according to the image.

6. The method as set forth in claim 1, wherein the markings are positioned according to a predetermined grid, vary in size according to the image, and are selected from the group consisting of indentations, holes, bumps, and blanks according to the image.

7. The method as set forth in claim 1, wherein each control file corresponds to each sheet and each marking, such that each sheet is produced by a plurality of processes performed by the machine and each process is controlled by a separate control file.

8. The method as set forth in claim 1, further including the step of assembling the sheets adjacent a building, thereby transferring the representation of the image to the building.

9. The method as set forth in claim 1, wherein the features include windows, doors, and edges of one or more individual sheets.

10. The method as set forth in claim 1, wherein the features are selected from the group consisting of windows, doors, and edges of one or more individual sheets.

11. A method of transferring a representation of an image to a surface of a building, the method comprising the steps of:

a) receiving the image as an image file;

b) converting the image file to a raster file comprising a series of dots that vary in size according to the image, wherein the dots are arranged according to a predetermined grid and selected ones of the dots are left blank according to the image;

c) scaling the raster file to the surface by dividing the raster file into a plurality of sub-components, such that each sub-component corresponds to a portion of the representation to be transferred to each of a plurality of individual metal sheets that are to be combined to form the surface;

d) associating the dots with markings selected from the group consisting of indentations, holes, and bumps according to the image;

e) manipulating the dots to accommodate features selected from the group consisting of windows, doors, and edges of the sub-components;

f) generating a plurality of control files that may be used by a machine to transfer the markings onto the sheets, thereby transferring the representation to the surface.

12. The method as set forth in claim 11, wherein each control file corresponds to each sheet and each marking, such that each sheet is produced by a plurality of processes performed by the machine and each process is controlled by a separate one of the control files.

13. The method as set forth in claim 11, further including the step of assembling the sheets adjacent the building, thereby transferring the representation of the image to the building.

14. A method of transferring a representation of an image to a surface of a building, the method comprising the steps of:

a) receiving the image as an image file selected from the group consisting of TIFF, JPEG, GIF, and BMP;

b) converting the image file to a raster file comprising a series of dots that vary in size according to the image, wherein the dots are arranged according to a predetermined grid and selected ones of the dots are left blank according to the image;

c) scaling the raster file to the surface, such that the image will occupy at least a majority of the surface;

d) dividing the raster file into a plurality of sub-components, such that each sub-component corresponds to a portion of the image;

e) associating each sub-component with each of a plurality of individual metal sheets that are to be combined to form the surface;

f) associating selected ones of the dots with indicia independent of the image;

g) associating the dots with markings selected from the group consisting of indentations, holes, and bumps according to the image;

h) manipulating the dots to accommodate windows of the surface;

i) manipulating the dots to accommodate doors of the surface;

j) manipulating the dots to accommodate edges of the sheets; and k) generating a plurality of control files that may be used by a machine to transfer the markings onto the sheets, thereby imparting the representation to the surface.

15. The method as set forth in claim 14, wherein each control file corresponds to each sheet and each marking, such that each sheet is produced by a plurality of processes performed by the machine and each process is controlled by a separate control file.

16. The method as set forth in claim 14, further including the step of assembling the sheets adjacent the building, thereby transferring the representation of the image to the building.

* * * * *

US007212688C1

(12) EX PARTE REEXAMINATION CERTIFICATE (10274th)

United States Patent

Zahner et al.

(10) Number: US 7,212,688 C1

(45) Certificate Issued: Aug. 27, 2014

(54) COMPUTER PROGRAM AND METHOD FOR CONVERTING AN IMAGE TO MACHINE CONTROL DATA

(75) Inventors: L. William Zahner, Kansas City, MO (US); Eric Willhelm, Lawrence, KS (US)

(73) Assignee: A. Zahner Co., Kansas City, MO (US)

Reexamination Request:
No. 90/013,083, Dec. 5, 2013

Reexamination Certificate for:

| | |
|---|---|
| Patent No.: | **7,212,688** |
| Issued: | **May 1, 2007** |
| Appl. No.: | **10/748,552** |
| Filed: | **Dec. 30, 2003** |

(51) Int. Cl.
*G06K 9/36* (2006.01)

(52) U.S. Cl.
USPC ........... 382/285; 345/419; 345/420; 345/427; 358/3.29; 358/3.3

(58) Field of Classification Search
None
See application file for complete search history.

(56) References Cited

To view the complete listing of prior art documents cited during the proceeding for Reexamination Control Number 90/013,083, please refer to the USPTO's public Patent Application Information Retrieval (PAIR) system under the Display References tab.

*Primary Examiner* — Adam L Basehoar

(57) ABSTRACT

A method of transferring a representation of an image to a surface (12) of a building (14). The method comprising receiving the image as an image file, converting the image file to a raster file comprising a series of dots, scaling the raster file to the surface and dividing the raster file into a plurality of sub-components, associating the dots with markings (26), and transferring the markings (26) onto a plurality of metal sheets (24). The markings (26) may be indentations, holes, and/or bumps. The dots may be manipulated to accommodate features (20) of the surface (12), such as windows, doors, indicia (22), and edges of the sheets (24). The markings (26) are preferably transferred to the sheets (24) by a metal working machine (28). Thus, the method may include generating one or more control files that may be used by the machine (28).

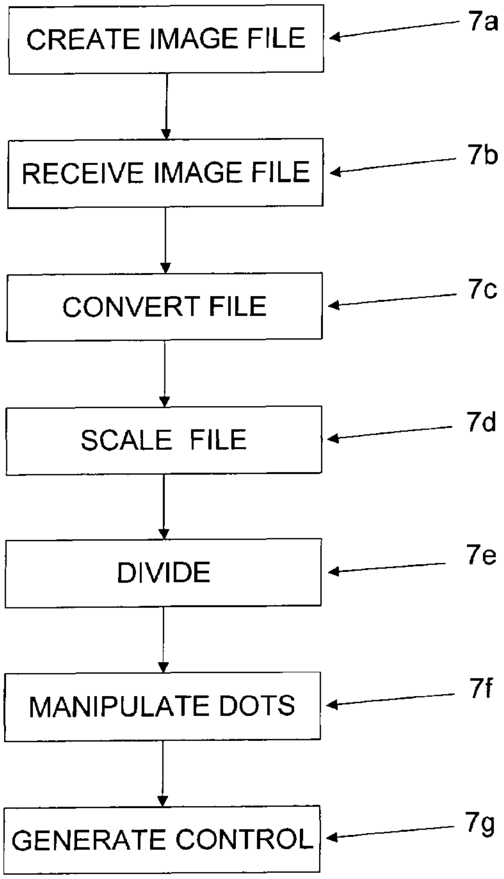

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 4 are cancelled.

Claims 1, 5-7 and 11-14 are determined to be patentable as amended.

Claims 2, 8-10, 15 and 16, dependent on an amended claim, are determined to be patentable.

New claims 17-20 are added and determined to be patentable.

1. A method of transferring a representation of an image to a surface, the method comprising the steps of:

a) receiving the image as an image file;

b) converting the image file to an intermediate file comprising a series of dots that vary *in dimensional size* according to the image;

c) *displaying and* manipulating the dots to accommodate features of the surface;

d) converting the intermediate file into at least one control file, the control file being operable to be utilized by a machine to physically manipulate the surface according to the dots, thereby transferring the representation to the surface; and e) scaling the intermediate file to the surface by dividing the intermediate file into a plurality of sub-components, wherein each of the sub-components corresponds to one of a plurality of individual sheets that are to be combined to form the surface and the surface is larger than the machine can handle.

5. The method as set forth in claim 1, wherein *each of the dots represent a marking to be applied to the surface, and* the markings are selected from the group consisting of indentations, holes, bumps, and blanks according to the image.

6. The method as set forth in claim 1, wherein *each of the dots represent a marking to be applied to the surface, and* the markings are positioned according to a predetermined grid, vary in size according to the image, and are selected from the group consisting of indentations, holes, bumps, and blanks according to the image.

7. The method as set forth in claim 1, wherein *each of the dots represent a marking to be applied to the surface, wherein the marking is one of a plurality of types of markings, and* each control file corresponds to [each sheet] *one of the sheets* and [each] *one of the types of* marking, such that each sheet [is produced by a plurality of processes performed by the machine and each process is controlled by a separate control file] *having multiple types of markings is manipulated by the machine using multiple separate control files*.

11. A method of transferring a representation of an image to a surface of a building, the method comprising the steps of:

a) receiving the image as an image file;

b) converting the image file to [a] *an intermediate* raster file comprising a series of dots that vary in *dimensional* size according to the image, wherein the dots are arranged according to a predetermined grid and selected ones of the dots are left blank according to the image;

c) scaling the *intermediate* raster file to the surface by dividing the *intermediate* raster file into a plurality of sub-components, such that each sub-component corresponds to a portion of the representation to be transferred to each of a plurality of individual metal sheets that are to be combined to form the surface;

d) associating the dots with markings selected from the group consisting of indentations, holes, and bumps according to the image*, wherein each of the dots represents at least one of the markings*;

e) *displaying and* manipulating the dots to accommodate *the* features *of the surface, wherein the features are* selected from the group consisting of windows, doors, and edges of the sub-components;

f) generating a plurality of control files that may be used by a machine to transfer the markings onto the sheets, thereby transferring the representation to the surface.

12. The method as set forth in claim 11, wherein each control file corresponds to [each sheet] *only one of the sheets* and [each] *only one of the types of* marking, such that each [sheet is produced by a plurality of processes performed by the machine and each process is controlled by a separate one of the control files] *one of the sheets requiring multiple types of markings is manipulated by the machine using multiple separate control files*.

13. The method as set forth in claim 11, further including the [step of] *steps of forming edge portions of at least some of the sheets into flanges; and* assembling the sheets adjacent the building *by attaching the flanges to at least one of each other and the building*, thereby transferring the representation of the image to the building.

14. A method of transferring a representation of an image to a surface of a building, the method comprising the steps of:

a) receiving the image as an image file selected from the group consisting of TIFF, JPEG, GIF, and BMP;

b) converting the image file to [a] *an intermediate* raster file comprising a series of dots that vary in size according to the image, wherein the dots are arranged according to a predetermined grid and selected ones of the dots are left blank according to the image;

c) scaling the *intermediate* raster file to the surface, such that the image will occupy at least a majority of the surface;

d) dividing the *intermediate* raster file into a plurality of sub-components, such that each sub-component corresponds to a portion of the image;

e) associating each sub-component with each of a plurality of individual metal sheets that are to be combined to form the surface;

f) [associating] *manipulating* selected ones of the dots [with] *to form* indicia independent of the image;

g) associating the dots with markings selected from the group consisting of indentations, holes, and bumps according to the image*, wherein each of the dots represents at least one of the markings*;

*h) displaying the dots for manipulation by a user;*

[h)] *i)* manipulating the dots to accommodate windows of the surface;

[i)] *j)* manipulating the dots to accommodate doors of the surface;

[j)] *k)* manipulating the dots to accommodate edges of the sheets; and

[k)] *l*) generating a plurality of control files that may be used by a machine to transfer the markings onto the sheets, thereby imparting the representation to the surface.

*17. A method of transferring a representation of an image to a surface, the method comprising the steps of:*

*a) receiving the image as an image file;*

*b) converting the image file to an intermediate file comprising a series of dots that vary in dimensional size according to the image;*

*c) scaling the intermediate file to the surface*

*d) dividing the intermediate file into a plurality of sub-components, wherein each of the sub-components corresponds to one of a plurality of individual sheets that are to be combined to form the surface and the surface is larger than a machine can handle;*

*e) displaying the dots for manipulation by a user;*

*f) manipulating the dots to accommodate features of the surface; and*

*g) converting the intermediate file into at least one control file, the control file being operable to be utilized by the machine to physically manipulate the surface according to the dots, thereby transferring the representation to the surface.*

*18. A method of transferring a representation of an image to a surface, the method comprising the steps of:*

*a) receiving the image as an image file;*

*b) converting the image file to an intermediate file having a different file format than the image file, wherein the intermediate file comprises a series of dots that vary in dimensional size according to the image;*

*c) scaling the intermediate file to the surface*

*d) dividing the intermediate file into a plurality of sub-components, wherein each of the sub-components corresponds to one of a plurality of individual sheets that are to be combined to form the surface and the surface is larger than a machine can handle;*

*e) displaying the dots for manipulation by a user;*

*manipulating the dots to accommodate features of the surface;*

*g) converting the intermediate file into at least one control file, the control file being operable to be utilized by the machine to physically manipulate the surface according to the dots, thereby the representation to the surface.*

*19. The method as set forth in claim 17, wherein the dots represent two or more different types of markings selected from the group consisting of indentations, holes, bumps, and blanks, wherein the dots are shown in different colors to indicate which type or types of markings each of the dots represents.*

*20. The method as set forth in claim 17, wherein the intermediate file includes a plurality of layers, with the dots of each of the layers corresponding to different types of markings.*

* * * * *